United States Patent [19]

Midolo

[11] 4,201,272
[45] May 6, 1980

[54] INTEGRAL HYDRAULIC VEHICLE DRIVE SYSTEM

[76] Inventor: Lawrence L. Midolo, 1475 Black Oak Dr., Centerville, Ohio 45459

[21] Appl. No.: 954,944

[22] Filed: Oct. 24, 1978

[51] Int. Cl.² ............................................. B62D 11/04
[52] U.S. Cl. .................................... 180/6.48; 60/484; 180/6.3
[58] Field of Search ........................ 180/6.3, 6.48, 6.2, 180/6.24; 188/181 R; 280/690, 691; 60/484

[56] References Cited

U.S. PATENT DOCUMENTS

| | | | |
|---|---|---|---|
| 3,175,364 | 3/1965 | Ilfield | 180/6.3 |
| 3,175,570 | 3/1965 | Voreaux et al. | 180/6.3 |
| 3,207,244 | 9/1963 | Becker et al. | 180/6.48 |
| 3,659,263 | 4/1972 | Gunsser et al. | 188/181 R |
| 3,759,295 | 9/1973 | Dence | 180/6.3 |
| 3,946,560 | 3/1976 | MacIntosh et al. | 180/6.3 |

FOREIGN PATENT DOCUMENTS 785071  10/1957  United Kingdom ..................... 280/690

OTHER PUBLICATIONS

Air Force Flight Dynamics Lab. Final Report, "Development of a Pneumatic-Fluidic Antiskid System", Oct. 1974, DDC AD-A009170.

Primary Examiner—Joseph F. Peters, Jr.
Assistant Examiner—Donn McGiehan
Attorney, Agent, or Firm—Joseph E. Rusz; Richard J. Killoren

[57] ABSTRACT

A hydraulic drive and braking system for vehicles having a pair of positive displacement pumps connected to drive axles attached to the wheels of the vehicle. Hydraulic fluid is supplied to the positive displacement motors from a reservoir by means of a variable displacement pump. The flow to the motors is controlled by a flow divider connected to the steering linkage. Braking is provided by blocking the return flow of the positive displacement motors. An antiskid system senses wheel rotation and responsive thereto prevents the blocking of the return flow of the positive displacement motors.

3 Claims, 6 Drawing Figures

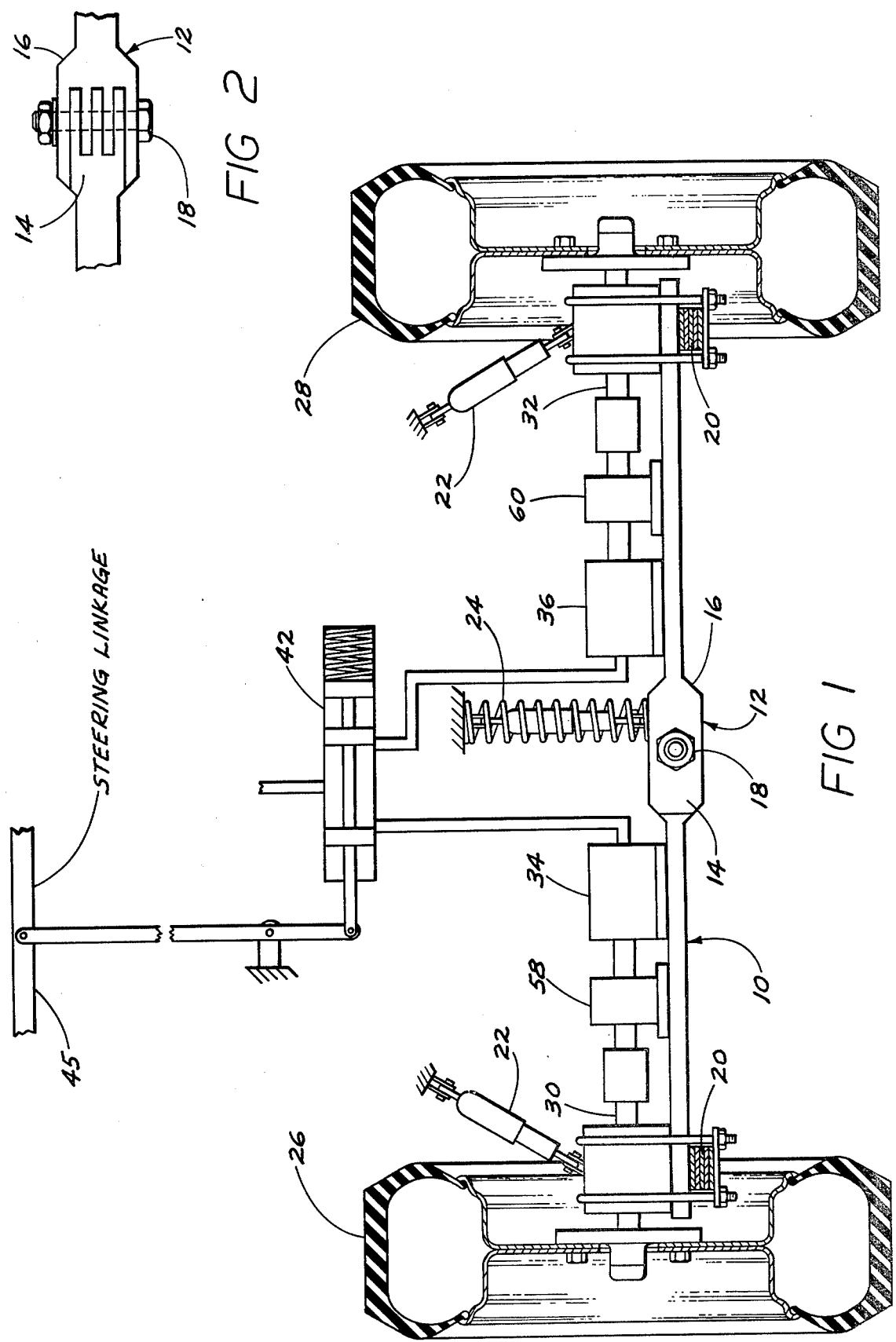

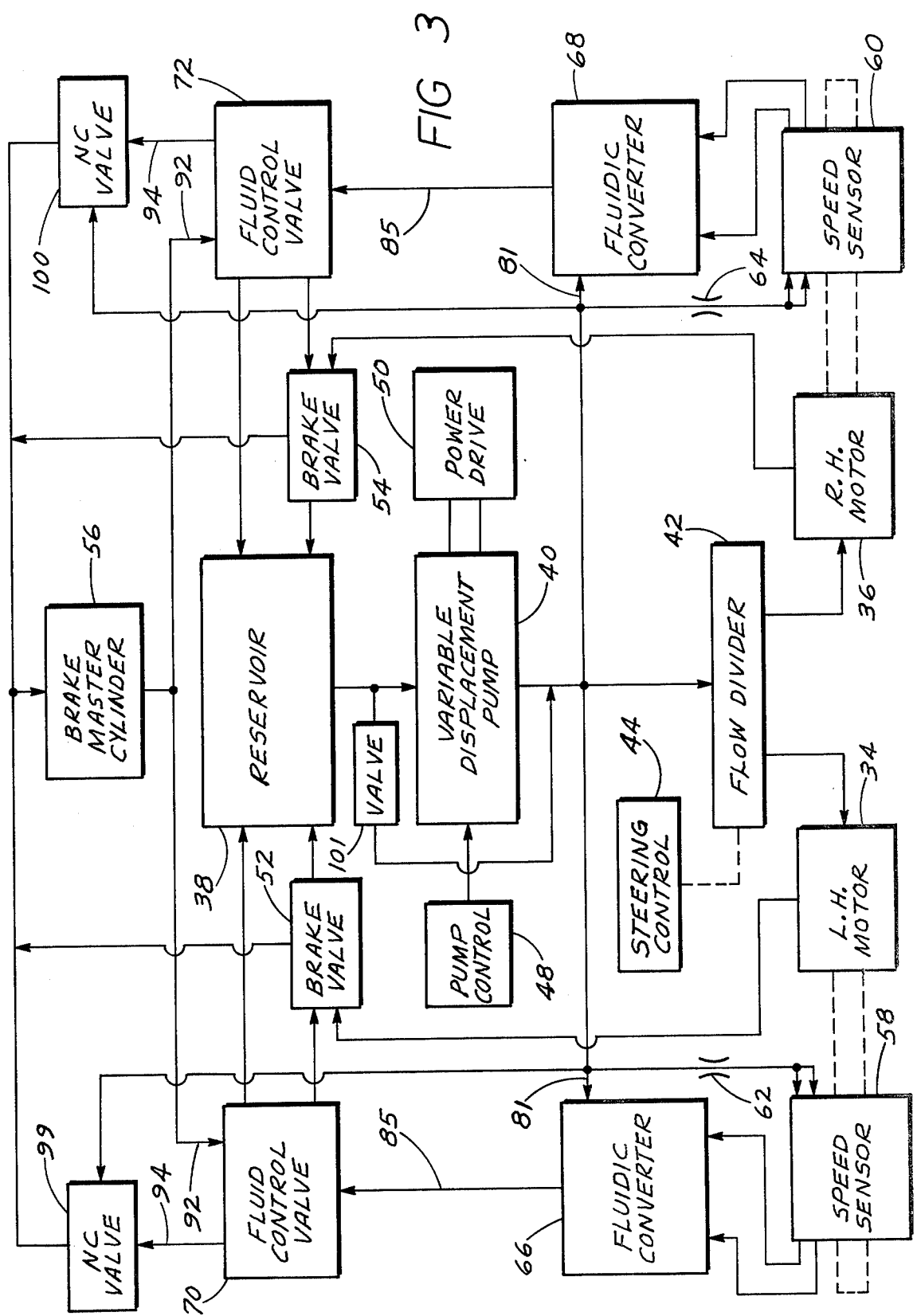

INTEGRAL HYDRAULIC VEHICLE DRIVE SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a hydraulic drive system for vehicles.

Hydraulic systems have been used in the transmission of power for vehicles and in the braking system for vehicles. The U.S. Pat. Nos. to Ilfield, 3,175,364; Voreaux et al, 3,175,570; Dence, 3,759,295; and MacIntosh et al, 3,946,560, disclose hydraulic transmission systems for vehicles.

The patent to Gunsser et al, U.S. Pat. No. 3,659,263, describes a wheel slip detection system for vehicles.

BRIEF SUMMARY OF THE INVENTION

According to this invention, a hydraulic system is provided wherein the transmission of power and braking are integrated into a single system. Braking is accomplished by increasing the back-pressure of positive displacement hydraulic motors which are used to drive the vehicle. Increasing the back pressure of the positive displacement motors causes the hydraulic motors to act as brakes.

An antiskid system is incorporated into the hydraulic drive and brake system. Speed sensors are used to sense wheel speed and to open a valve in the hydraulic brake line as the wheels approach zero speed. This will open the brake valve to reduce the back pressure on the hydraulic drive motors and will prevent wheel skid.

IN THE DRAWINGS

FIG. 1 is a schematic diagram of a hydraulic drive system for a vehicle.

FIG. 2 is a bottom view of a hinge plate used in the device of FIG. 1.

FIG. 3 is a schematic hydraulic flow block diagram for the device of FIG. 1.

DETAILED DESCRIPTION OF THE INVENTION

Figure 4:
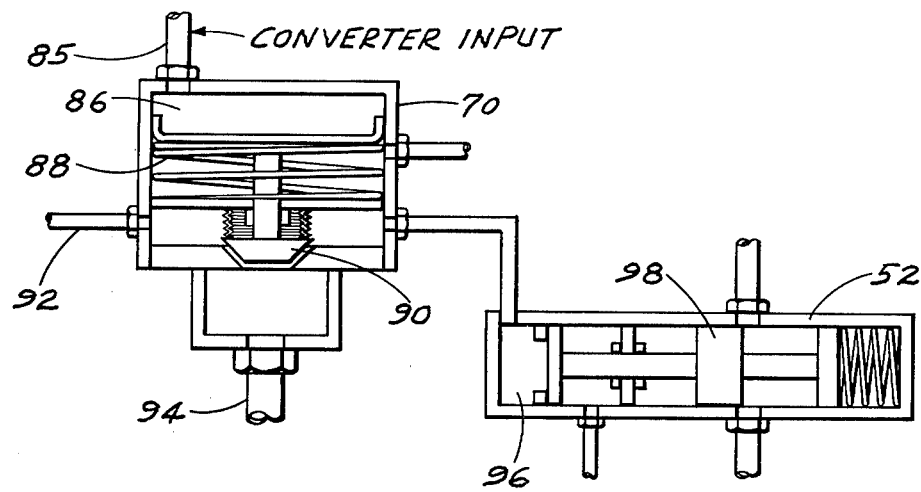
FIG. 4 is a schematic diagram of the fluid control valve and brake valve used in the device of FIG. 1.

Reference is now made to FIG. 1 of the drawing which shows a rear axle 10, such as for use on a vehicle, having a hinge plate 12 including two interleaved members 14 and 16 held by bolt 18, as shown in FIG. 2 Conventional springs 20 and shocks 22 are secured to the axle 10. A conventional spring shock 24 is connected to support the hinge plate 12.

A pair of wheels 26 and 28 are connected to drive axles 30 and 32 which are supported on axle 10. A pair of hydraulic motors 34 and 36 are supported on axle 10 and are secured to drive axles 30 and 32.

Hydraulic fluid is supplied to motors 34 and 36 from a reservoir 38 by means of a variable displacement pump 40 and a flow divider 42, as shown in FIG. 3. The flow divider is connected to steering control 44, such as the steering linkage of a vehicle indicated schematically at 45, in FIG. 1, or as shown in Dence and Voreaux et al.

The variable displacement pump has its output controlled by a pump control 48, which may be a swash plate control as described in MacIntosh et al. The position of the swashplate can be controlled by a hand operated mechanical linkage or by a hydraulically operated mechanical linkage as in MacIntosh et al.

The variable displacement pump is driven by a power drive 50, which for example, can be an internal combustion engine, a steam engine, a battery powered electric motor or other known power plant.

To provide braking for the device, valves 52 and 54 are provided in the return lines for the hydraulic motors 34 and 36. With positive displacement motors used such as AM14C and AM8C-1 by Abex or MF1-37 by Vickers, blocking the return from motors 34 and 36 increases the back pressure on the motors, thus causing the motors to act as brakes.

An antiskid system is incorporated into the braking system by controlling the flow of brake fluid from master cylinder 56 to the brake valves 52 and 54.

Figure 5:
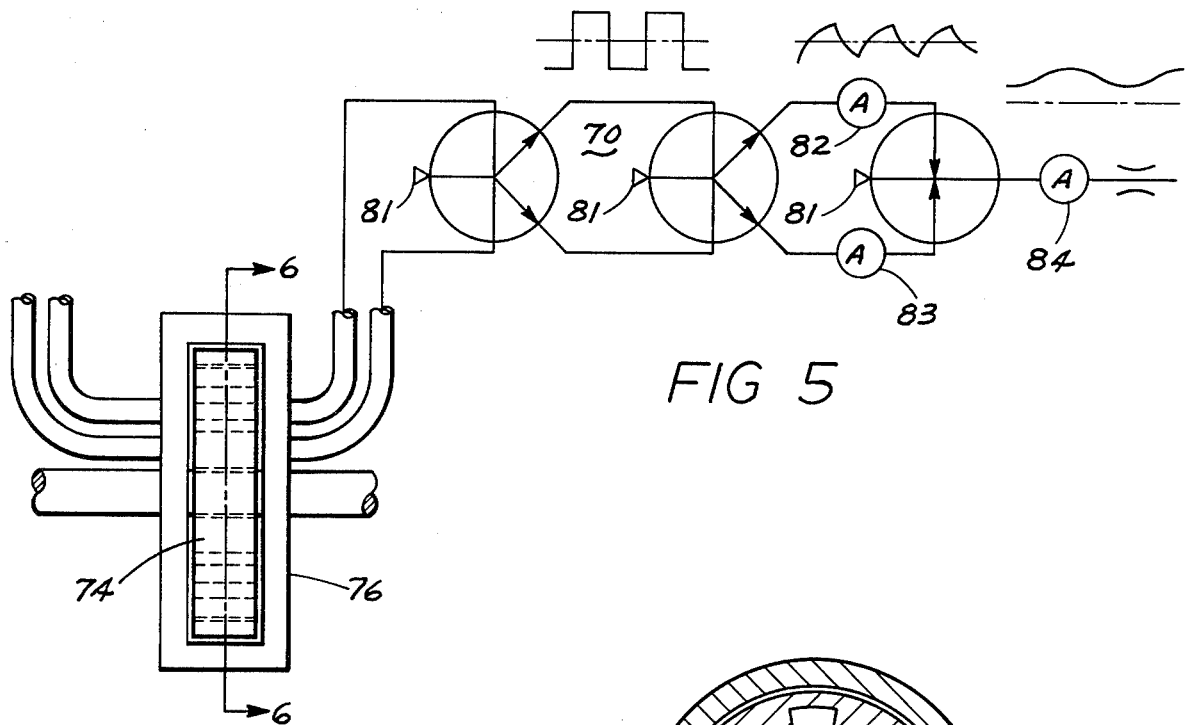
FIG. 5 is a schematic diagram of the speed sensing and converter used in the device of FIG. 1.
Figure 6:
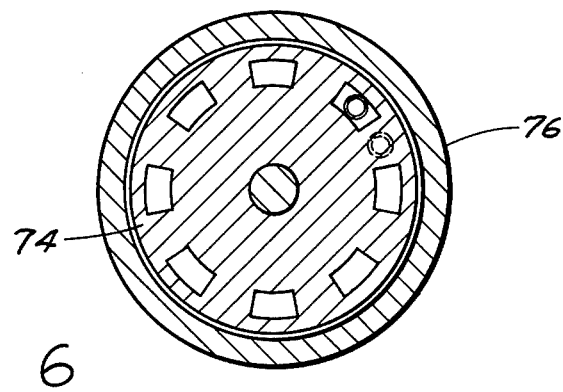
FIG. 6 is a sectional view of the device of FIG. 5 along the line 6-6.

Speed sensors 58 and 60 are supported on the axle 10 and are connected to drive axles 30 and 32. Hydraulic fluid is supplied to the speed sensors 58 and 60 from the variable displacement pump 40 through flow restrictors 62 and 64 to drop the hydraulic pressure to the speed sensors. The output of the speed sensors is supplied to fluidic signal converters 66 and 68 to provide control signals for fluid valves 70 and 72. The speed sensors 58 and 60 include a chopper 74 within a housing 76 as shown in FIGS. 5 and 6. The fluidic signal blocks may be conventional fluidic converters such as described on pages 13-16 of the Air Force Flight Dynamics Laboratory Final Report "Development of a Pneumatic-fluidic Antiskid System" October 1974, available from Defense Documentation Center, AD-A009170, wherein the capacitance elements marked with C are replaced with accumulators 82, 83 and 84 such as conventional air bag accumulators, to adapt the system for use with the hydraulic liquid. The power inputs at 81 of the converter are supplied directly from the pump 40.

As the wheel speed approaches zero speed the converter output approaches zero pressure thus reducing pressure at input 85 into chamber 86 of the fluid signal control valves 70 and 72, as shown in FIG. 4. This permits spring 88 to open valve 90 to bypass the flow from the master cylinder at input 92 to outlet return 94 thus reducing the pressure in chamber 96 of brake valves 52 and 54 permitting partial opening of valve 98 to reduce the back pressure on the hydraulic motors and avoid skid. At normal speeds valve 90 is held closed by the high pressure output from the converters 66 and 68 and all of the input from the master cylinder at inlet 92 is supplied to chamber 96 so that the brake operates in a normal manner.

Since valve 90 would be open when the variable displacement pump is not operating, such as when the vehicle is being towed, normally closed valves 99 and 100 are provided in the return lines 94 of the brake master cylinder to permit normal operation of the braking system. With the pump 40 not operating under these conditions a bypass valve 101 is opened to permit a flow of hydraulic fluid around the variable displacement pump 40. With wheels 26 and 28 rotating the motors 34 and 36 will act as pumps. The closing of valves 52 and 54 will provide braking by increasing the back pressure on the positive displacement motors 34 and 36 acting as pumps. In normal operation an output from pump 40 will open valves 99 and 100.

In the operation of the device as motor 50 drives pump 40 hydraulic fluid is supplied to the hydraulic motors 34 and 36 to drive the wheels 26 and 28. The flow divider apportions the flow to motors 34 and 36 in response to an input from the steering mechanism as in the patents to Dence and Voreaux et al. At normal speeds with valve 90 closed in the control valves 70 and 72, the operation of the master cylinder 56 supplies a flow of brake hydraulic fluid to brake valves 52 and 54 to close the valves and increase the back pressure on the positive displacement pumps 34 and 36. This will cause the pumps to act as brakes to slow the vehicle.

Speed sensors 58 and 60 sense the wheel speed and provide a reduced output pressure from fluidic converters 66 and 68 to valves 70 and 72 as the vehicle wheels approach zero speed. The reduced pressure to valves 70 and 72 open valves 90 to thereby reduce the pressure in chambers 96 to permit partial opening of valves 98. This reduces the back pressure on motors 34 and 36 to reduce the braking effect and to avoid skid.

When the vehicle is pushed without motor 50 running, valve 101 is opened to bypass the variable displacement pump 40. Rotation of the wheels will cause motors 34 and 36 to act as pumps. With reduced hydraulic pressure in the output of pump 40, valves 99 and 100 will close blocking return through valve 90. When the master cylinder 56 is operated the pressure in chamber 96 will be increased to close valves 98 to increase the back pressure on motors 34 and 36, acting as pumps and thus provide braking for the vehicle.

Emergency braking, not shown, could be provided by including a disc or drum brake on axles 30 and 32.

There is thus provided an integrated transmission and braking system for vehicles with an antiskid system included in the system.

I claim:

1. A hydraulic drive and braking system for a vehicle comprising: a pair of wheel drive axles; means for supporting said drive axles; a pair of wheels secured to said drive axles; a pair of positive displacement hydraulic motors supported on said drive axle supporting means and connected to said drive axles; a variable displacement hydraulic pump; means for driving said pump; means for selectively controlling the output of said pump; means for connecting the output of said variable displacement pump to said hydraulic motors; means connected between the variable displacement pump and said motors for selectively dividing the output of the variable displacement pump to said hydraulic motors; means for selectively blocking the output of said hydraulic motors to thereby provide braking for the vehicle; said means for selectively blocking the output of said hydraulic motors including a master cylinder and a valve, in the output line of each of the hydraulic motors, responsive to an output from said master cylinder; means, responsive to the rotational speed of the drive axles for reducing the portion of the output of the master cylinder applied to the valves in the output lines of the hydraulic motors as the rotational speed of the drive axles approaches zero speed.

2. The device as recited in claim 1 wherein said means for reducing the output of the master cylinder applied to the valves in the output lines of the hydraulic motors includes fluid control valves connected between the master cylinder and valves in the output lines of the hydraulic motors; and means responsive to the rotational speed of said drive axles for controlling said fluid control valves.

3. The device as recited in claim 2 wherein said means for selectively dividing the output of the variable displacement pump to the hydraulic motors is responsive to the steering linkage.

* * * * *